(12) United States Patent
Pickard et al.

(10) Patent No.: US 10,318,477 B2
(45) Date of Patent: Jun. 11, 2019

(54) MANAGING AND ARCHIVING SYSTEM AND APPLICATION LOG FILES

(75) Inventors: Jonathan J. Pickard, Cave Creek, AZ (US); William W. Foster, Jr., Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 602 days.

(21) Appl. No.: 12/787,664

(22) Filed: May 26, 2010

(65) Prior Publication Data
US 2011/0295813 A1 Dec. 1, 2011

(51) Int. Cl.
*G06F 16/11* (2019.01)
(52) U.S. Cl.
CPC .................. *G06F 16/113* (2019.01)
(58) Field of Classification Search
CPC .................. G06F 17/30073; G06F 16/113
See application file for complete search history.

(56) References Cited

U.S. PATENT DOCUMENTS

| | | | |
|---|---|---|---|
| 5,956,489 A * | 9/1999 | San Andres et al. | 709/221 |
| 6,018,619 A * | 1/2000 | Allard et al. | 709/224 |
| 6,247,149 B1 * | 6/2001 | Falls | G06F 11/0748 714/45 |
| 6,429,946 B1 * | 8/2002 | Bresnan | G06K 15/00 358/1.15 |
| 6,470,388 B1 * | 10/2002 | Niemi et al. | 709/224 |
| 6,823,507 B1 * | 11/2004 | Srinivasan et al. | 717/152 |
| 6,859,834 B1 * | 2/2005 | Arora et al. | 709/227 |
| 6,925,476 B1 * | 8/2005 | Multer | G06F 17/30144 |
| 7,222,228 B1 * | 5/2007 | Stephens, Jr. | H04L 41/042 713/1 |
| 7,675,867 B1 * | 3/2010 | Mraz | H04L 63/123 370/254 |
| 7,966,260 B2 * | 6/2011 | Gernold | 705/51 |
| 7,991,740 B2 * | 8/2011 | McCarthy et al. | 707/635 |
| 8,024,712 B1 * | 9/2011 | Korolev | G06F 11/3495 717/127 |
| 8,041,683 B1 * | 10/2011 | Korolev et al. | 707/672 |
| 8,117,165 B1 * | 2/2012 | Winckelmann et al. | 707/640 |
| 8,131,672 B2 * | 3/2012 | Hind et al. | 707/610 |
| 8,779,921 B1 * | 7/2014 | Curtiss | 340/541 |
| 8,903,970 B2 * | 12/2014 | Krelle | H04L 67/22 709/223 |
| 2001/0014164 A1 * | 8/2001 | Daniels | G06Q 10/107 382/101 |
| 2001/0056362 A1 * | 12/2001 | Hanagan | G06Q 10/063 705/7.11 |
| 2002/0143792 A1 * | 10/2002 | Belu | G06F 9/445 |

(Continued)

OTHER PUBLICATIONS

"Accessible," Dictionary.com (retrieved on Sep. 28, 2016).*

*Primary Examiner* — James Trujillo
*Assistant Examiner* — Hubert Cheung
(74) *Attorney, Agent, or Firm* — Womble Bond Dickinson (US) LLP; Daniel E. Ovanezian (57) ABSTRACT

A mechanism for managing and archiving system and application log files is disclosed. A method of the invention includes accessing log files on shared storage that satisfy grouping requirements, combining the accessed log files that satisfy the grouping requirements into a single combined log file, compressing the single combined log file, and storing the single combined log file to an archival storage location.

20 Claims, 4 Drawing Sheets

(56) References Cited

U.S. PATENT DOCUMENTS

| | | | |
|---|---|---|---|
| 2003/0149800 A1* | 8/2003 | Bouchet | G06F 11/3476 |
| | | | 719/318 |
| 2004/0103406 A1* | 5/2004 | Patel | G06F 8/41 |
| | | | 717/140 |
| 2005/0138111 A1* | 6/2005 | Aton | G06F 11/3476 |
| | | | 709/201 |
| 2005/0160427 A1* | 7/2005 | Ustaris | 718/100 |
| 2006/0149788 A1* | 7/2006 | Bosloy et al. | 707/201 |
| 2007/0067362 A1* | 3/2007 | McArdle | G06F 17/30073 |
| 2007/0168967 A1* | 7/2007 | Chopra | G06F 11/3688 |
| | | | 717/124 |
| 2007/0186068 A1* | 8/2007 | Agrawal | 711/162 |
| 2008/0256556 A1* | 10/2008 | Dufourd | G06F 3/0481 |
| | | | 719/318 |
| 2008/0270486 A1* | 10/2008 | Hind et al. | 707/201 |
| 2008/0306977 A1* | 12/2008 | Karuppiah | G06F 11/2038 |
| 2009/0228509 A1* | 9/2009 | McCarthy et al. | 707/102 |
| 2010/0039284 A1* | 2/2010 | Hall | G06Q 10/06 |
| | | | 340/8.1 |
| 2010/0088354 A1* | 4/2010 | Wu et al. | 707/827 |
| 2010/0145978 A1* | 6/2010 | Anashkin et al. | 707/769 |
| 2011/0191394 A1* | 8/2011 | Winteregg et al. | 707/822 |
| 2011/0314148 A1* | 12/2011 | Petersen | G06F 11/3476 |
| | | | 709/224 |
| 2014/0081983 A1* | 3/2014 | Smith et al. | 707/741 |
| 2015/0249579 A1* | 9/2015 | Ellsworth | H04L 67/125 |
| | | | 709/221 |

* cited by examiner

MANAGING AND ARCHIVING SYSTEM AND APPLICATION LOG FILES

TECHNICAL FIELD

The embodiments of the invention relate generally to system and application log files and, more specifically, relate to a mechanism for managing and archiving system and application log files.

BACKGROUND

Due to various reasons, log file management and archival is a common requirement in Information Technology (IT). These reasons may include legal requirements, fraud prevention and detection, statistic collection and analysis, incident and problem detection.

The process of managing and archiving these logs is very manual and time-consuming without an automated process to manage and store the files. An organization may have many physical servers that each capture log data whenever any action occurs. For example, when someone visits the organization's website, a log file may be created on one of the servers that serves the organization's website. However, there may be multiple servers each tasked with serving the organization's website and each may serve the same data. As a result, different users may hit different servers when they access the website. Because each server has its own log file specific to the server and separate from the other servers, log files for the same task may be kept on many different servers. Log files are generally not logged to a unified log file. This results in the problem of multiple, spread-out log files without any process to bring them together in a concise format for ease of management and archiving.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide for managing and archiving system and application log files. A method of embodiments of the invention includes accessing log files on shared storage that satisfy grouping requirements, combining the accessed log files that satisfy the grouping requirements into a single combined log file, compressing the single combined log file, and storing the single combined log file to an archival storage location.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "accessing", "combining", "compressing", "storing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for managing and archiving system and application log files. The mechanism for managing and archiving log files provides improvements around the scripts and steps that run on a master log file system server that relate to condition and error checking and reporting, and the option for "pulling" the log files from the remote hosts, rather than the remote hosts pushing them to the shared storage location that the master log file system server can access. Embodiments of the invention automate each step of the log file management and archival process and require little to no oversight, allowing an IT department to work on more time-consuming tasks.

Figure 1:
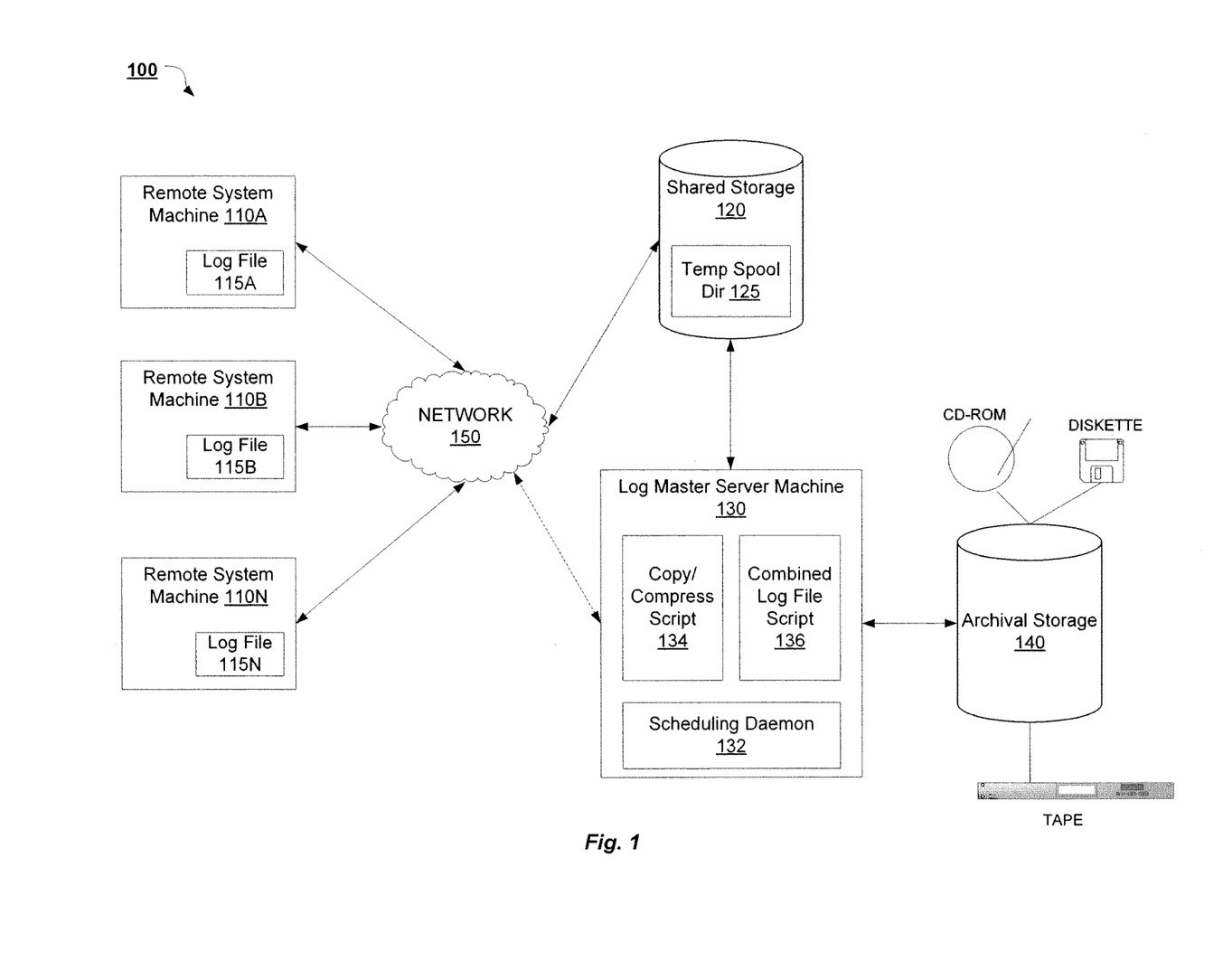
FIG. 1 is a block diagram of a log file system according to an embodiment of the invention.

FIG. 1 is a block diagram of a log file system 100 according to an embodiment of the invention. In one embodiment, log file system 100 includes one or more remote system machines 110A-110N, a shared storage location 120, a log master server machine 130, and an archival storage location 140. The shared storage locations 120 may be a separate database machine or may be co-located with any of the remote system machines 110A-110N. Similarly, the archival storage location 140 may be a separate database machine or may be co-located with the log master server machine 130. The remote system machines 110A-110N are communicably coupled to the shared storage source 120 via network 150. Network 150 may be a private network (e.g., a local area network (LAN), wide area network (WAN), intranet, etc.) or a public network (e.g., the Internet). In some embodiments, the remote system machines 110A-110N may be directly connected (not shown) to the shared storage source 120.

In some embodiments, remote system machines 110A-110N may be operating as part of a larger organization to provide data and other service for the organization. Each remote system machine 110A-110N, upon performance of any action at the remote system machine 110A-110N, actively writes to a log file 115A-115N stored on the remote system machine 110A-110N. In some embodiments, examples of data that could be logged include, but are not limited to, web logs storing access request for specific web sites hosted on servers, login attempts to a server, and automated monitoring messages from the operating system. These log files could be stored in one or more different formats. The remote system machine 110A-110N is configured to stop writing to its log file 115A-115N after a certain amount of time or a certain amount of log entries. In some embodiments, the remote system machine 110A-110N writes to its specific log file 115A-115N until that log file is rotated out by another application (such as logrotate).

Once the log file 115A-115N is rotated out and is no longer being written to by the system or the application, it is moved or copied to a temporary spool directory 125 on a shared storage source 120. In some embodiments, the log file 115A-115N may be compressed at this time to reduce the amount of space it uses. The copy/move and compression of this file is initiated by a regularly scheduled script 134 that is started by a scheduling daemon 132, such as 'crond', of the log master server machine 130. In some embodiments, the copy/compress script 134 is placed on each remote system machine 110A-110N and runs according to predetermined time settings.

The shared storage source 120 is accessible by all of the systems 110A-110N whose log files 115A-115N are being managed and archived by the log master server machine 130. In addition, the shared storage source 120 is also accessible by the log master server machine 130. The log master server machine 130 is a master server that performs additional steps to combine and archive the log files in embodiments of the invention.

On a regular basis, and through the scheduling daemon 132, a script 136 runs on the log master server machine 130 that uncompresses any compressed log files on the shared storage source 120, combines log files from grouped systems, and then stores the combined log file to an archival storage location 140. A system may be grouped by the type of data it serves, the department it is associated with, the services it runs, and so on.

In one embodiment, an administrator may logically group logs together when developing a profile that gets passed to the combined log file script 136. This profile basically provides grouping requirement that may be provided as arguments to the combined log file script 136. In embodiments of the invention, multiple profiles may be created to accommodate the variety of types of log files. For example, three separate profiles could be created for log files falling into the three example groups previously discussed of web logs, login attempts, and automated monitoring messages. As a result, each group of log files would be archived separately. This allows the compressed archived file to be easily analyzed if ever needed.

In one embodiment, the combined log file script 136 accesses the temporary spool directory 125 of the shared storage 120, uncompresses any compressed files, and merges them to one large log file. This one large log file may be stored in the temporary spool directory 125 or on another spool directory on the log master server machine 130. The combined log file script 136 identifies which log files should be combined based on the servers the files originated from and the time the files were stored. In one embodiment, the script 136 is given certain arguments that help identify these log files that should be combined.

The archival location 140 stores the combined log files for later retrieval and analysis as needed, or archives these files to a backup medium, such as CD-ROM, tape, or diskette, if desired. The archived and combined log can then be stored permanently in-place. Once the logs are combined by the log master server machine 130, the individual logs 115A-115N stored in the temporary spool directory 125 of the shared storage 120 are deleted. In one embodiment, once the log files are converged/merged onto an archival location 140, the archive log files are compressed again.

In one alternative embodiment, an option exists to temporarily store the log files 115A-115N locally on the remote systems 110A-110N, rather than copy or move them to the shared storage source 120. If this method is employed, the scheduled script 134 on the logrunner system pulls the script from the remote systems 110A-110N storing the log files 115A-115N using a protocol such as HyperText Transport Protocol (HTTP), File Transfer Protocol (FTP), Secure Copy (SCP), or RSYNC. An application/daemon should be configured on the remote systems 110A-110N storing the log files 115A-115N to allow the log master server machine 130 to access the remote systems 110A-110N via that method.

For instance, if HTTP is to be used, the remote system 110A-110N should run a web server application, such as Apache, that is configured to allow the log master server machine 130 to retrieve a specific log file 115A-115N in its temporary location on the remote system 110A-110N and store it to the temporary spool directory 125 on the shared storage source 120 in a pull copy fashion. This avoids a need to place a script on each remote system 110A-110N that performs the copying/compression function. The log master server machine 130 accomplishes this job instead, thereby saving resources on the remote system machines 110A-110N.

Embodiments of the invention are also able to automatically troubleshoot the management and archival process of log files. Each script 134, 136 that is produced by the log master server machine 130 includes error detection code with conditions that indicate any problems that may occur in the process. For example, the error code for scripts 134 running on each individual remote system machine 110A-110N may check that the environment is properly set up, directories exist, that log files 115A-115N that it thinks should be there are there, and that the file system that it is writing to (shared storage source) has enough space available in advance before it starts copying data over. The error code for scripts running on the log master server machine 130 may check to make sure files are there from individual remote system machines 110A-110N, check to see if it is okay to ignore any missing log files, confirm there is available space in the archival storage location 140, and so on. In addition, this error checking code provides explanations about why any log files were not processed so that an administrator can determine what went wrong.

Figure 2:
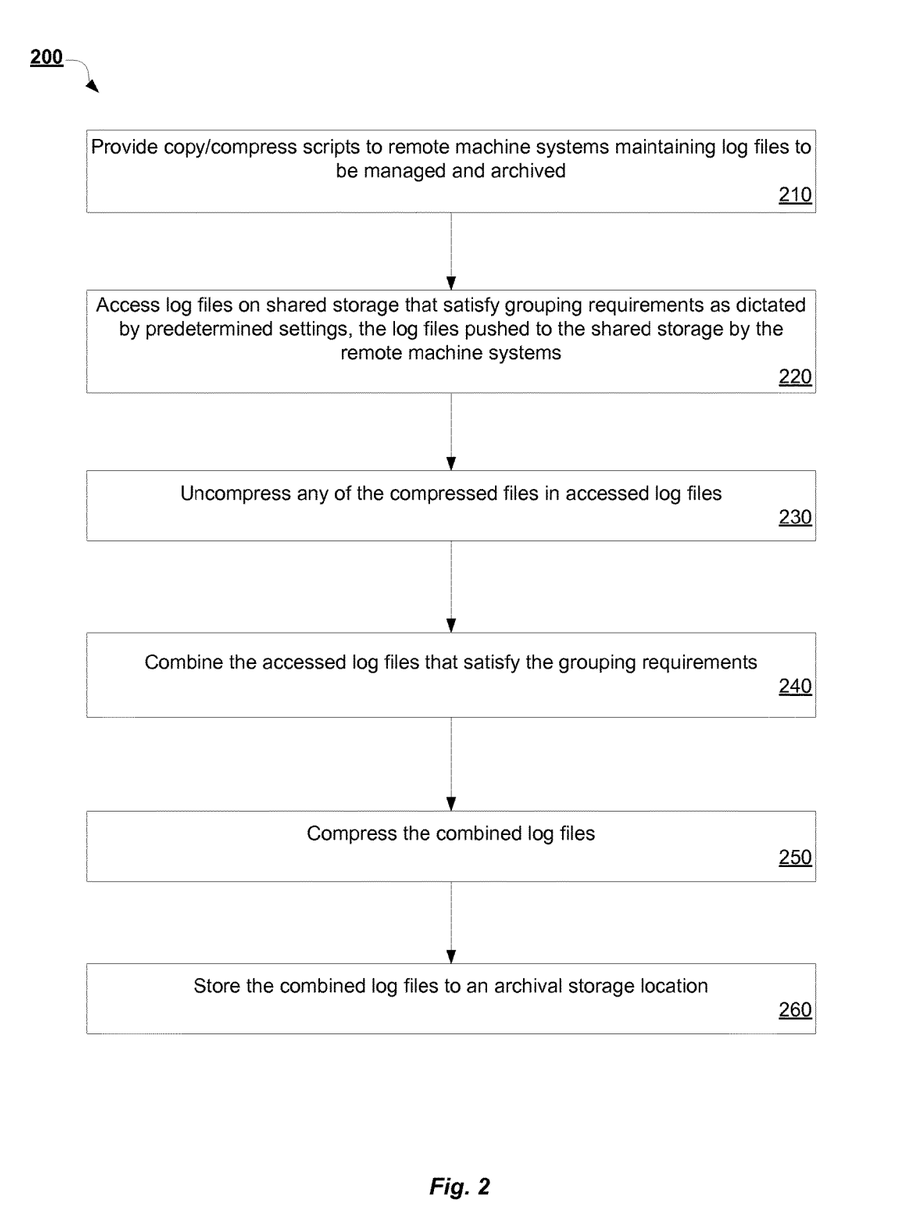
FIG. 2 is a flow diagram illustrating a method for managing and archiving system and application log files according to an embodiment of the invention.

FIG. 2 is a flow diagram illustrating a method 200 for managing and archiving system and application log files according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by log master server machine 130 of FIG. 1.

Method 200 begins at block 210 where copy/compress scripts are provided to remote system machines that maintain log files to be managed and archived by the log master server machine. In one embodiment, these copy/compress scripts are provided from a scheduling daemon on the log master server machine that configures the timing during which the copy/compress scripts should be run. The copy/compress scripts cause the remote server machines to copy their log files to a shared storage source. The copy/compress script may also cause the log files to be compressed at this point. At block 220, any log files that are on the shared storage location that satisfy certain grouping requirements are accessed. In one embodiment, these grouping requirements dictate how log files should be combined. For instance, the grouping requirement may include arguments that specify accessing all log files from a particular server (e.g., a web page server) that were created on a certain day. These log files have been pushed to the shared storage location per the copy/compress script provided to the remote system machines at block 210.

At block 230, any of the accessed log files that are compressed are uncompressed. Then, at block 240, these accessed log files are combined into a single file. The combined log files are then compressed at block 250. Finally, the single combined log file is stored to an archival storage location at block 260. The archival location provides for later retrieval and analysis of the log files as needed, or for further archival to a backup medium, such as CD-ROM, tape, or diskette, if desired.

Figure 3:
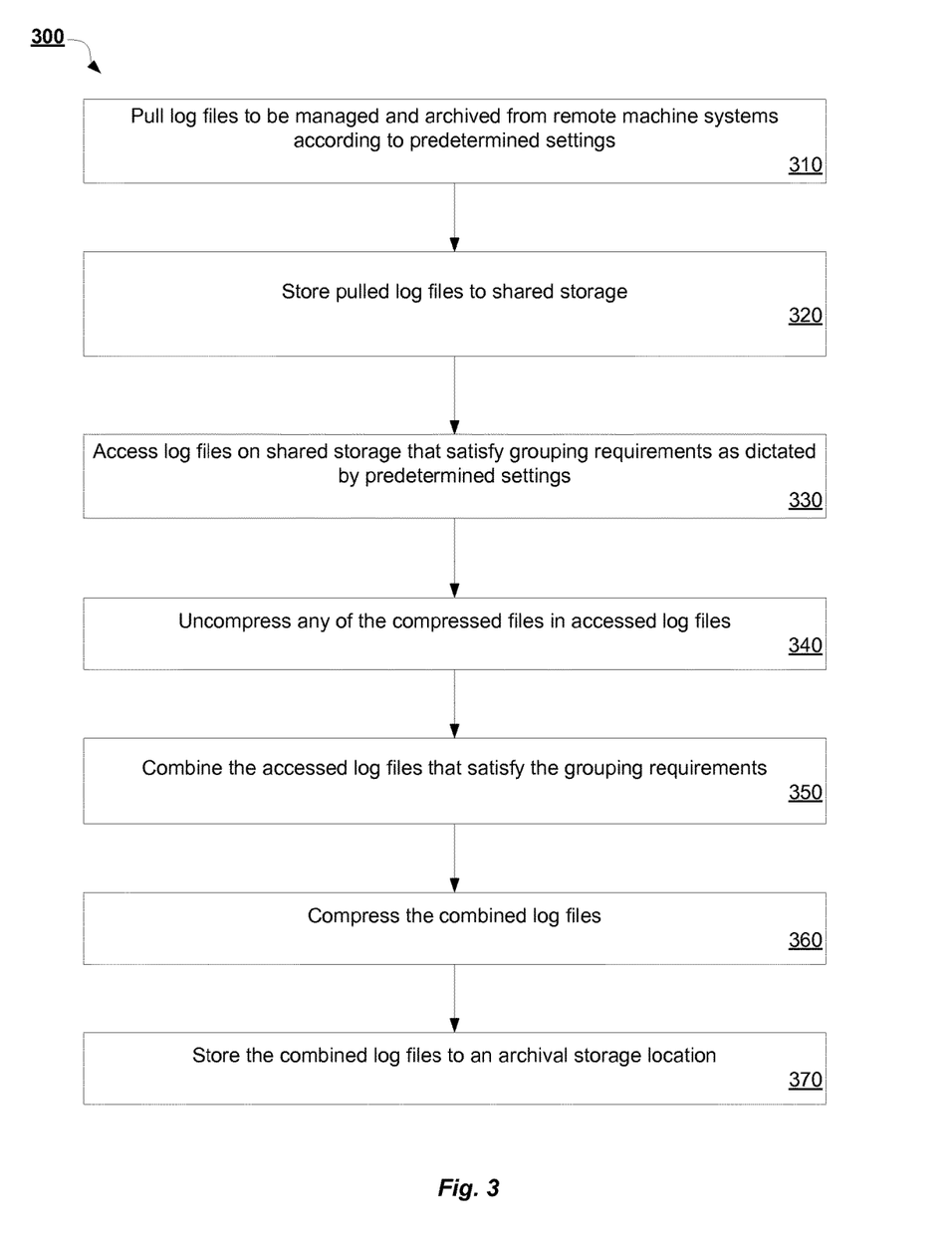
FIG. 3 is a flow diagram illustrating a method for an alternative e embodiment for managing and archiving system and application log files according to an embodiment of the invention.

FIG. 3 is a flow diagram illustrating a method 300 for an alternative embodiment for managing and archiving system and application log files according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by log master server machine 130 of FIG. 1.

Method 300 begins at block 310 where log files to be managed and archived by the log master server machine are pulled from remote machine systems according to predetermined settings. In one embodiment, a scheduling daemon on the log master server machine may cause a script to run at preconfigured time intervals that pulls the log files from particular remote system machines. At block 320, these pulled log files are saved to a shared storage location. In one embodiment, the log files may be saved to a temporary spool directory on the shared storage location.

At block 330, any log files that are on the shared storage location that satisfy certain grouping requirements are accessed. In one embodiment, these grouping requirements dictate how log files should be combined. For instance, the grouping requirement may include arguments that specify accessing all log files from a particular server (e.g., a web page server) that were created on a certain day.

At block 340, any of the accessed log files that are compressed are uncompressed. Then, at block 350, these accessed log files are combined into a single file. The combined log files in the single file are then compressed at block 360. Finally, the single combined log file is stored to an archival storage location at block 370. The archival location provides for later retrieval and analysis of the log files as needed, or for further archival to a backup medium, such as CD-ROM, tape, or diskette, if desired.

Figure 4:
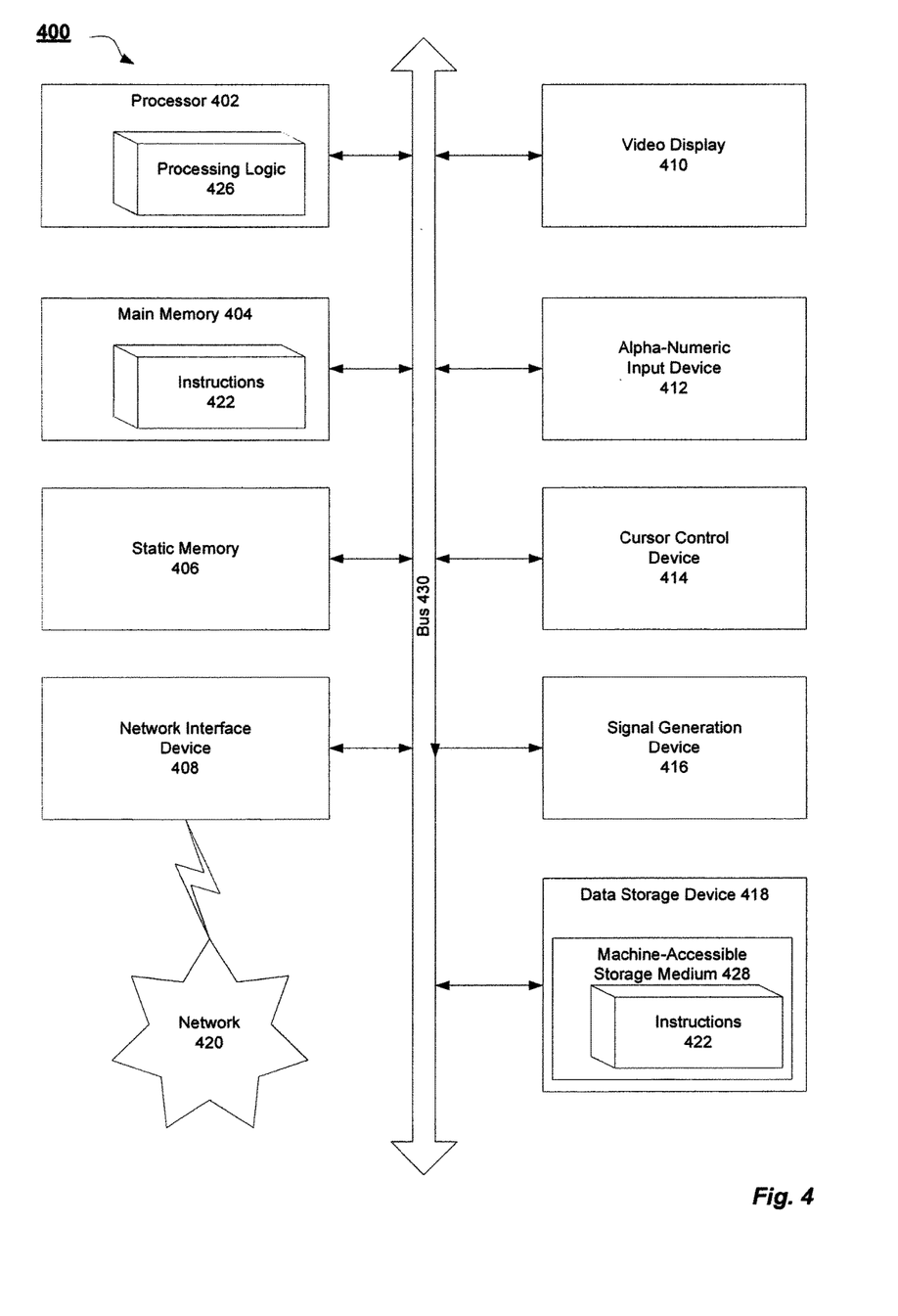
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. For example, software 422 may store instructions to perform managing and archiving system and application log files by log master server machine 130 described with respect to FIG. 1. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to store instructions to perform methods 200 and 300 for managing and archiving system and application log files described with respect to FIGS. 2 and 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
receiving, by a processing device of a log master server machine, log files from disparate remote system machines separate from the log master server machine;
executing, by the processing device, error checking code to identify missing log files of the received log files from the disparate remote system machines and determine whether to ignore the missing log files;
in response to determining to ignore the missing log files, storing, by the processing device, the received log files on shared storage of the log master server machine, wherein the received log files on the shared storage are accessible to the log master server machine and the disparate remote system machines;
identifying, by the processing device of the log master server machine, log files of the received log files, wherein the identified log files satisfy grouping requirements that comprise at least a source of the log files or a time of creation of the log files;
combining, by the processing device of the log master server machine, the identified log files that satisfy the grouping requirements into a single combined log file;
deleting the identified log files from the shared storage after combining the identified log files into the single combined log file;
compressing, by the processing device of the log master server machine, the single combined log file; and
storing, by the processing device of the log master server machine, the single combined log file to an archival storage location, wherein the combined log file is compressed after storing to an archival storage location.

2. The method of claim 1, wherein the log files are pushed to the shared storage by one or more of the disparate remote system machines that created the log files, the pushing caused by a copy script placed on each of the one or more disparate remote system machines by the log master server machine.

3. The method of claim 1, wherein the log files are pulled to the shared storage from one or more of the disparate remote system machines that created the log files, the pulling caused by a pull script run by the log master server machine.

4. The method of claim 1, wherein the grouping requirements are provided as arguments into a combine log files script executed by the processing device of the log master server machine.

5. The method of claim 1, wherein executing the error checking code on the log master server machine further comprises performing at least one of a check that all accessed log files originate from one or more of the disparate remote system machines authorized by the log master server machine or a confirmation that there is available space in the archival storage location.

6. The method of claim 5, further comprising running error checking code on each of the one or more of the disparate remote system machines to perform at least one of a check that an environment of the one or more of the disparate remote system machines is properly set up, a check that log files directories exist on the one or more of the disparate remote system machines, a check that the log files are actually there, or a check that a shared storage source has enough space available in advance before it starts copying data over to the shared storage source.

7. The method of claim 6, wherein the error checking code provides explanations to an administrator of the log master server machine about any errors it encounters.

8. The method of claim 1 further comprising:
determining, by the processing device of the log master server machine, that the single combined log file is stored in the archival storage location; and
deleting the identified log files that satisfy the grouping requirements from the shared storage.

9. The method of claim 1 further comprising:
enabling access, by the processing device of the log master server machine, to shared storage by a first of the disparate remote system machines separate from the log master server machine.

10. A system, comprising:
a shared storage device;
an archival storage device; and
a log master server machine, executed by a processing device, communicably coupled to the shared storage device and the archival storage device, the processing device of the log master server machine to:
  receive log files from disparate remote system machines separate from the log master server machine;
  execute error checking code to identify missing log files of the received log files from the disparate remote system machines and determine whether to ignore the missing log files;
  in response to determining to ignore the missing log files, store the received log files on the shared storage device, wherein the received log files on the shared storage device are accessible to the log master server machine and the disparate remote system machines;
  identify a first set of log files of the received log files, wherein the log files of the first set of log files satisfy grouping requirements of a first profile;
  combine the identified first set of log files that satisfy the grouping requirements of the first profile into a first combined log file;
  delete the identified first set of log files from the shared storage in response to combining the identified first set of log files;
  store the first combined log file to the archival storage device;
  identify a second set of log files of the received log files, wherein the log files of the second set of log files satisfy grouping requirements of a second profile;
  combine the identified second set of log files that satisfy the grouping requirements of the second profile into a second combined log file; and
  store the second combined log file to the archival storage device, wherein the combined log file is compressed after storing to an archival storage location.

11. The system of claim 10, wherein the log files are pushed to the shared storage device by one or more of the disparate remote system machines that create the log files, the pushing caused by a copy script placed on each of the disparate remote system machines by the log master server machine.

12. The system of claim 10, wherein the log files are pulled to the shared storage from one or more of the disparate remote system machines that create the log files, the pulling caused by a pull script run by the log master server machine.

13. The system of claim 10, wherein the grouping requirements of the first profile comprise a name of a disparate remote system machine that created the log files and a time interval that the log files were created.

14. The system of claim 13, wherein the grouping requirements of the first profile are provided as arguments into a combine log files script executed by the processing device of the log master server machine.

15. The system of claim 10, wherein the processing device of the log master server machine is further to perform at least one of a check that all accessed log files originate from one or more of the disparate remote system machines authorized by the log master server machine, or a confirm that there is available space in the archival storage location.

16. The system of claim 15, wherein the disparate remote system machines perform at least one of a check that an environment of the disparate remote system machine is properly set up, a check that log files directories exist on the disparate remote system machine, a check that the log files are actually there, or a check that the shared storage source has enough space available in advance before it starts copying data over to the shared storage source the checking by the disparate remote system machines caused by an error checking script placed on each of the one or more disparate remote system machines by the log master server machine.

17. A non-transitory machine-readable storage medium including instructions that, when accessed by a processing device, cause the processing device to:
  receive, by the processing device, log files from disparate remote system machines separate from a log master server machine;
  execute, by the processing device, error checking code to identify missing log files of the received log files from the disparate remote system machines and determine whether to ignore the missing log files;
  in response to determining to ignore the missing log files, store, by the processing device, the received log files on shared storage of the log master server machine, wherein the received log files on the shared storage are accessible to the log master server machine and the disparate remote system machines;
  identify, by the processing device of the log master server machine, log files of the received log files, wherein the identified log files satisfy grouping requirements that comprise at least a source of the log files or a time of creation of the log files;
  delete the identified log files from the shared storage in response to combining the identified log files;
  combine, by the processing device of the log master server machine, the identified log files that satisfy the grouping requirements into a single combined log file;
  compress, by the processing device of the log master server machine, the single combined log file; and
  store, by the processing device of the log master server machine, the compressed single combined log file to an archival storage location, wherein the combined log file is compressed after storing to an archival storage location.

18. The non-transitory machine-readable storage medium of claim 17, wherein the log files are pushed to the shared storage by one or more of the disparate remote system machines that created the log files, the pushing caused by a copy script placed on each of the one or more disparate remote system machines by the log master server machine.

19. The non-transitory machine-readable storage medium of claim 17, wherein the log files are pulled to the shared storage from one or more of the disparate remote system machines that created the log files, the pulling caused by a pull script run by the log master server machine.

20. The non-transitory machine-readable storage medium of claim 17, wherein the grouping requirements are provided as arguments into a combine log files script run by the log master server machine.

* * * * *